Dec. 25, 1934.  N. B. GALKIN  1,985,406

INTERMITTENT DRIVING MECHANISM

Filed Jan. 4, 1934

INVENTOR
NATHAN B. GALKIN
BY Joseph Blacker
ATTORNEY

Patented Dec. 25, 1934

1,985,406

UNITED STATES PATENT OFFICE 1,985,406

INTERMITTENT DRIVING MECHANISM

Nathan B. Galkin, New York, N. Y.

Application January 4, 1934, Serial No. 705,214

1 Claim. (Cl. 192—12)

This invention relates to an improvement in intermittent driving mechanism for shafts operating at high speed and wherein the wear of the driving and braking parts has proven a serious factor.

The main trouble encountered in operating intermittent mechanism at high speed is that the gripping members of the clutch do not operate quickly enough to instantly grip and turn the shaft and the braking members do not operate quickly enough to instantly release the shaft.

I have found in actual practice that for high speed operating conditions, the clutching surfaces should have a gradual wedging effect in order to secure a positive grip and for this purpose curved roller contacting surfaces are essential on the oscillating member, while for the brake mechanism it is necessary to provide a quick release and the roller contacting surfaces on the brake member should be straight.

I have found that in order to provide these contrasting effects in a combined clutch and brake mechanism, the clutch and brake must be of dissimilar structures contrary to the usual practice of employing identical roller contacting structures in the clutch and brake.

An object of this invention is to provide an intermittent drive having an oscillating clutch member formed to provide a positive grip, and having a brake structure formed to provide a quick release, and wherein the wear is distributed all over the surfaces of the moving parts and the position of the worn parts is automatically readjusted to counteract the wear and increase the life of the mechanism.

With the above and other objects in view, the invention will be hereinafter more particularly described, and the combination and arrangement of parts will be shown in the accompanying drawing and pointed out in the claim which forms part of the specification.

Reference will now be had to the drawing, wherein like numerals of reference designate corresponding parts throughout the several views, in which.

Figure 2:
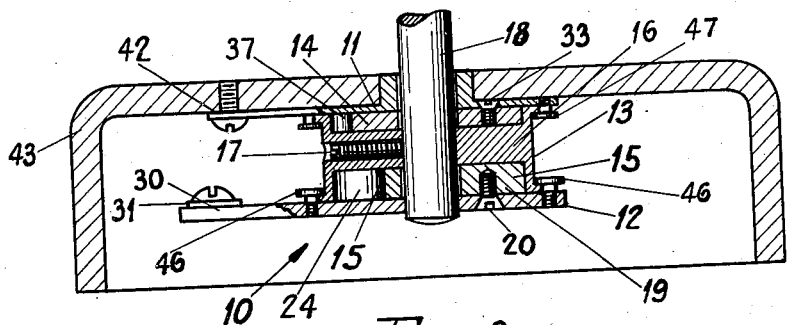
Figure 2 is a central vertical section taken as on line 2—2 in Figure 1.
Figure 3:
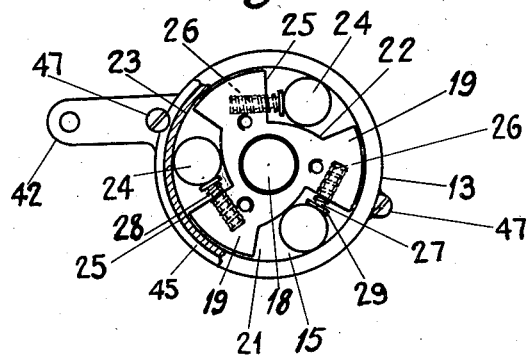
Figure 3 is a plan view of the mechanism with the lower cover plate removed and showing the clutching detent carrier.

In Figure 2 of the drawing reference character 10 indicates an assembled intermittent driving mechanism having an upper cover plate 11 and a lower cover plate 12. The mechanism 10 comprises an annular casing 13, which is provided with a chamber 14 of shallow depth at its upper elevation and with a chamber 15 of greater depth at the lower elevation. Between the upper and lower chambers there has been provided a partition wall 16. A set screw 17 is threaded in the partition wall 16 and grips the shaft 18, which is to be intermittently driven. In the lower chamber 15, best shown in Figure 3, there is an oscillatable clutching detent carrier 19, which is secured to the lower cover plate 12 by means of screws 20. The oscillatable member 19 is provided with three peripheral recesses 21, having curved or cam-shaped bottom surfaces 22, positioned in eccentric relation with the inner circumference 23 of the casing 13. Roller detents 24 have been placed inside the recesses 21 and contact with the curved surfaces 22. The curved surfaces 22 adjoin radially positioned walls 25, having apertures 26 in which are plungers 27 and coil springs 28. The plungers 27 are provided with heads 29. The springs are adapted to engage the heads 29 of the plungers 27, and force them into effective engagement with the rollers 24, and force the rollers toward the narrow ends of the recesses 21 and wedge them between the oscillatable member 19 and the inner circumference 23 of the casing 13. Each peripheral recess 21 contains a detent roller 24 and a spring 28 forcing the roller toward the narrow ends of the recesses when the parts are assembled in operative relation in the casing 13.

When it is attempted to turn the oscillatable clutching detent member 19, the rollers are wedged at three points of the inner surface of the casing 13, and the oscillatable detent carrier 19 and the casing 13 are locked together into unitary relation. The lower cover plate 12 is formed with an integral crank arm 30 to which is pivoted a link 31 that may be connected to any suitable part of a mechanism designed to vibrate the arm.

Figure 1:
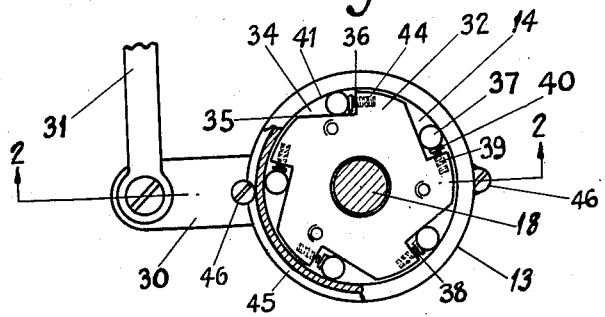
Figure 1 is a plan view of the mechanism with the upper cover plate removed and showing the braking detent carrier.

In the upper chamber 14, best shown in Figure 1, there is a braking detent carrier 32, which is fixed to the upper cover plate 11 by means of screws 33. The detent carrier 32 is provided with five peripheral recesses 34, having flat bottom surfaces 35 positioned in perpendicular relation to radial walls 36. Roller detents 37 have been placed inside the recesses 34 and contact with the flat surfaces 35. The radial walls 36 are provided with apertures 44 in which are plungers 38 and coil springs 39. The plungers 38 are provided with heads 40. The springs are adapted to engage the heads 40 of the plungers 38 and force them into effective engagement with the roller detents 37 and force the rollers away from the radial walls 36 and wedge them between the detent carrier 32 and the inner circumference 41 of the casing 13.

The upper cover plate 11 is formed with an integral crank arm 42, which may be secured to the framework 43 forming a housing for the rotatable shaft 18 of an overseaming machine where it is necessary to turn the shaft in one direction, and step-by-step, to provide a positive feed high-speed intermittent clutch.

It is to be noted that the oscillatable clutching detent carrier 19 is mounted on the shaft 18 to face in the opposite direction to the fixed braking detent carrier 32. As shown in Figure 2, the covers 11 and 12 respectively have heads of screws 46 and 47 in engagement with flanges 45 on the casing 13 thus connecting the covers and casing into unitary relation. Upon vibrating the arm 30, the casing 13 is partially turned and the shaft 18 is rotated. When the vibratory motion is reversed, the shaft 18 is locked by the jamming of the members 32, 37 and 13, and no retrograde movements or back-lash is possible. The vibratory arm 30 in moving back and forth thus imparts a step-by-step rotary motion to the casing 13 and to the shaft 18 in one direction only.

It is also to be noted that the peripheral recesses 34 in the fixed braking detent carrier 32, have radially positioned walls 36 which are in perpendicular relation with the flat bottom surfaces 35 and that the coil springs 39 are mounted in perpendicular relation with the radial walls and in central alignment with the rollers 37. The springs 39 force the rollers away from the radial walls 36 in a direction substantially perpendicular to said walls. The peripheral recesses 21 in the oscillatable clutch detent carrier 19, have radially positioned walls 25 which adjoin the curved and eccentric bottom surfaces 22. The coil springs 28 are mounted in perpendicular relation with the radial walls 25 and in central alignment with the rollers 24. The springs 28 force the rollers away from the radial walls 25 in a direction substantially perpendicular to said walls.

I claim:

An intermittent driving mechanism comprising a shaft, an oscillatable clutching detent carrier positioned in spaced relation with a fixed braking detent carrier, both carriers being mounted concentrically with said shaft, said detent carriers being housed within an annular casing fixed to said shaft, said oscillatable clutching detent carrier having peripheral recesses with curved and eccentric bottom surfaces, radial walls and coil springs mounted in perpendicular relation with said walls to gradually wedge the clutching surfaces, said braking detent carrier having peripheral recesses with flat bottom surfaces, radial walls and coil springs mounted in perpendicular relation with said walls to provide quick-release braking surfaces, a spring pressed detent roller in each of said recesses and extending therethrough into forced contact with the inner surface of said casing, a fixed cover secured to said braking detent carrier, a vibratory arm and cover secured to said oscillatable clutching detent carrier, said casing having flanges in engagement with the heads of screws in said covers and connecting said covers and casing into unitary relation.

NATHAN B. GALKIN.